(12) United States Patent
Kitahara et al.

(10) Patent No.: US 7,234,349 B2
(45) Date of Patent: Jun. 26, 2007

(54) AIR FLOW RATE MEASURING DEVICE HAVING BYPASS PASSAGE

(75) Inventors: Noboru Kitahara, Hekinan (JP);
Hideki Matsuura, Kariya (JP);
Tomomi Taniguchi, Kariya (JP)

(73) Assignee: DENSO Corporation (JP)

( * ) Notice: Subject to any disclaimer, the term of this patent is extended or adjusted under 35 U.S.C. 154(b) by 164 days.

(21) Appl. No.: 11/108,797

(22) Filed: Apr. 19, 2005

(65) Prior Publication Data
US 2005/0252289 A1 Nov. 17, 2005

(30) Foreign Application Priority Data
Apr. 28, 2004 (JP) .............................. 2004-133756

(51) Int. Cl.
*G01F 1/68* (2006.01)
(52) U.S. Cl. ................ 73/202.5; 73/202.22; 73/202.21
(58) Field of Classification Search ............... 73/202.5, 73/204.21, 202.22, 861.52
See application file for complete search history.

(56) References Cited

U.S. PATENT DOCUMENTS

| | | | |
|---|---|---|---|
| 5,804,718 A | 9/1998 | Nagasaka et al. | ............. 73/202 |
| 6,223,594 B1 | 5/2001 | Takiguchi et al. | |
| 6,526,822 B1 | 3/2003 | Maeda et al. | |
| 6,619,140 B2 | 9/2003 | Kitahara et al. | |
| 2003/0046996 A1 | 3/2003 | Nakada et al. | ............. 73/202.5 |
| 2004/0003659 A1 | 1/2004 | Kato et al. | .................... 73/202 |
| 2005/0241389 A1 | 11/2005 | Kitahara et al. | |

FOREIGN PATENT DOCUMENTS

| | | |
|---|---|---|
| JP | 11-23336 | 1/1999 |
| JP | 2005315740 | * 11/2005 |

OTHER PUBLICATIONS

Office Action dated Sep. 18, 2006 in U.S. Appl. No. 11/108,753.
U.S. Appl. No. 11/108,753, filed Apr. 19, 2005; Client Ref: 83495-US-SHM/cy; Inventors: Noboru Kitahara et al., Claims priority of: JP 2004-133856 filed Apr. 28, 2004.
Chinese Office Action dated Dec. 29, 2006 issued in counterpart Chinese Appln. No. 200510067040.9 with English translation.

* cited by examiner

*Primary Examiner*—Jewel Thompson
(74) *Attorney, Agent, or Firm*—Nixon & Vanderhye PC

(57) ABSTRACT

A measurement body is provided with a sub-outlet arranged between a U-turn portion of a bypass passage and a main outlet. The sub-outlet includes a first sub-outlet positioned on a path of air, which flows on the inside of the bypass passage, and a second sub-outlet positioned on a path of air, which flows on the outside of the bypass passage. The respective sub-outlets open in a sidewall surface of the measurement body along the thickness-wise direction. However, the first sub-outlet and the second sub-outlet are arranged in different positions with respect to the flow direction of measurement air. With this structure, a substantial length of the bypass passage can be adjusted in accordance with positions of the first sub-outlet and the second sub-outlet, so that compensation of intake pulsation is enhanced in accuracy. Thereby, measurement error caused by influences of intake pulsation can be reduced.

13 Claims, 5 Drawing Sheets

AIR FLOW RATE MEASURING DEVICE HAVING BYPASS PASSAGE

CROSS REFERENCE TO RELATED APPLICATIONS

This application is based on and incorporates herein by reference Japanese Patent Application No. 2004-133756 filed on Apr. 28, 2004.

FIELD OF THE INVENTION

The present invention relates to an air flow rate measuring device having an air passage in which a bypass passage is formed, and a sensing unit for measurement of an air flow rate, the sensing unit being arranged in the bypass passage.

BACKGROUND OF THE INVENTION

In an air flow rate measuring device disclosed in JP-A-11-23336, a hole is formed between an inlet and an outlet of a bypass passage provided with a heater element. The hole communicates the bypass passage with a main air passage. Besides, pressure difference causes through the hole between the side of the bypass passage thereof and the side of the main air passage thereof, so that air flows from the bypass passage to the main air passage through the hole. Thereby, flow velocity increases at the heater element in the bypass passage, so that measuring accuracy is enhanced even when a flow rate is low.

An intake air quantity is measured in an internal combustion engine in a conventional structure, in which a bent portion is formed midway a bypass passage to change air in flow direction, so that a length of the bypass passage is adjusted. Thereby, measurement error, which is caused by influences of intake pulsation, is decreased. Here, as disclosed in JP-A-11-23336, a hole is provided midway a bypass passage, so that air, which flows through the bypass passage, partially flows into a main air passage through the hole, so that the same effect as when the bypass passage is modified in length may be produced.

In a bent portion provided in a bypass passage, a hole may be arranged in the same position relative to both a path of air flowing on the inside of the bent portion and a path of air flowing on the outside of the bent portion. However, in this structure, effect of compensation of intake pulsation becomes different between the respective paths from each other, and accuracy of compensation may become insufficient.

SUMMARY OF THE INVENTION

In view of the foregoing problems, it is an object of the present invention to provide an air flow rate measuring device that is capable of decreasing measurement error caused by influences of intake pulsation.

According to the present invention, an air flow rate measuring device includes a measurement body and a sensing unit. The measurement body defines a bypass passage and a bent portion. The bypass passage is defined in an air passage, through which air flows. The bent portion is arranged midway the bypass passage. The bent portion changes a flow direction of air. The sensing unit is arranged in the bypass passage. The sensing unit measures a flow rate of air flowing through the bypass passage. The measurement body has a wall surface, outside which air flows. The wall surface defines a sub-outlet that is an opening. The sub-outlet is arranged between the bent portion and a passage outlet opened to a downstream end of the bypass passage. The sub-outlet is formed with at least a first sub-outlet and a second sub-outlet. The first sub-outlet and the second sub-outlet open to different paths between a path of air flowing on the inside of the bent portion and a path of air flowing on the outside of the bent portion. The first sub-outlet and the second sub-outlet are arranged in different positions with respect to the flow direction of air flowing through the bypass passage.

The first sub-outlet is positioned on the path of air flowing on the inside of the bent portion. The second sub-outlet is positioned on the path of air flowing on the outside of the bent portion. The first sub-outlet is arranged on the downstream side with respect to the second sub-outlet.

Alternatively, an air flow rate measuring device includes a measurement body and a sensing unit. The measurement body defines a bypass passage and a bent portion. The bypass passage is defined in an air passage through which air flows. The bent portion is arranged midway the bypass passage. The bent portion changes a flow direction of air. The sensing unit is provided in the bypass passage to measure a flow rate of air flowing through the bypass passage.

The measurement body has a wall surface, outside which air flows. The wall surface defines a sub-outlet that is an opening. The sub-outlet is arranged between the bent portion and a passage outlet opened to a downstream end of the bypass passage. The sub-outlet includes an inside opening and an outside opening. The inside opening is positioned on a path of air flowing on the inside of the bent portion. The outside opening is positioned on a path of air flowing on the outside of the bent portion. The inside opening and the outside opening are defined as one continuous opening. The inside opening and the outside opening are shifted in position with respect to a flow direction of air flowing through the bypass passage.

The inside opening of the sub-outlet is arranged on the downstream side with respect to the outside opening of the sub-outlet. The wall surface of the measurement body, in which the sub-outlet opens, defines a flow deflecting means that is capable of deflecting air, which flows outside the measurement body, from the sub-outlet. The measurement body has the wall surface, in which the sub-outlet opens. The wall surface defines a step as the flow deflecting means on the upstream side of the opening of the sub-outlet with respect to the flow direction of air flowing outside the measurement body. The sub-outlet includes an opening that opens along a flow direction of air flowing through the bypass passage. The sensing unit includes a heater element that measures an air flow rate on the basis of a quantity of heat, which is radiated to air.

With this structure, a substantial length of the bypass passage can be adjusted in accordance with positions of the first sub-outlet and the second sub-outlet, so that compensation of intake pulsation is enhanced in accuracy. Thereby, measurement error caused by influences of intake pulsation can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1A:
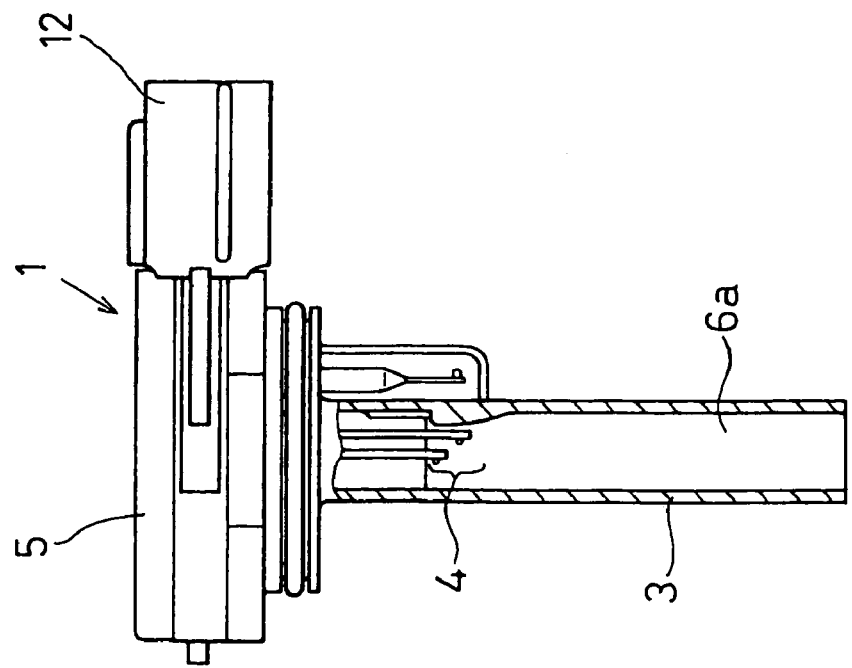
FIG. 1A is a cross sectional view showing an air flow-meter when being viewed from the transverse direction.
Figure 1B:
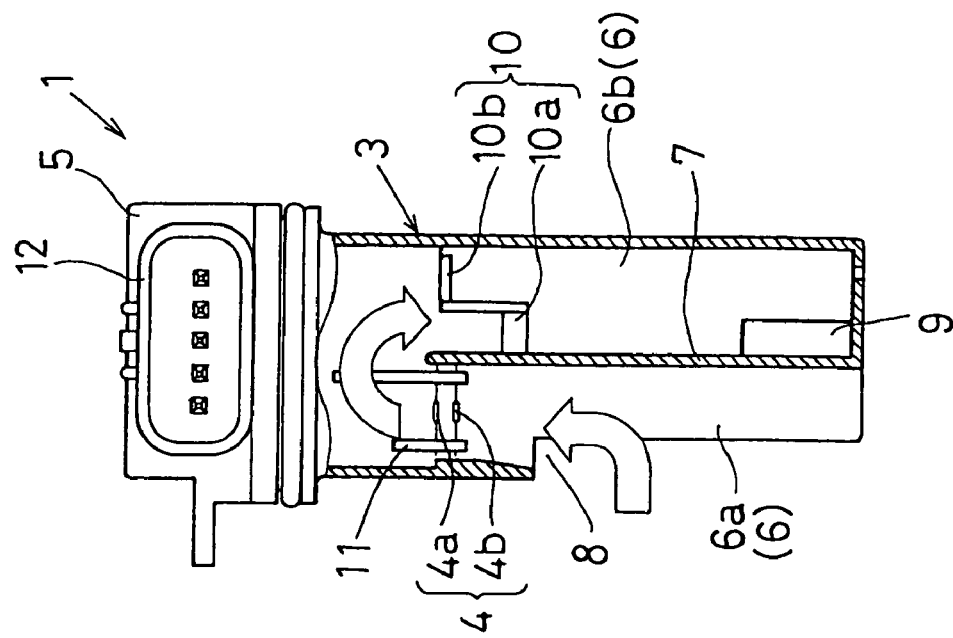
FIG. 1B is a cross sectional view showing the air flowmeter when being viewed from the thickness-wise direction according to the first embodiment of the present invention.
Figure 2:
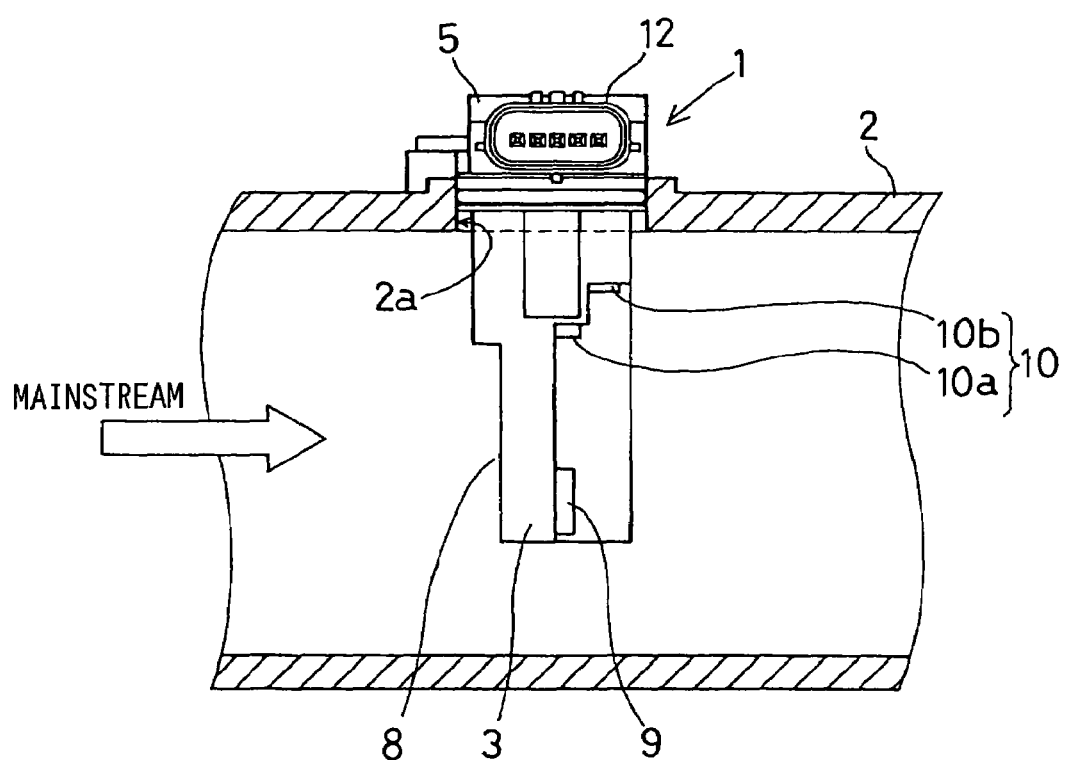
FIG. 2 is a cross sectional view showing the air flowmeter that is mounted to an intake duct.

As shown in FIGS. 1A, 1B, an air flowmeter (air flow rate measuring device) 1 measures an intake air quantity of an internal combustion engine. As shown in FIG. 2, the air flowmeter 1 is mounted to an intake duct (air passage) 2 that defines an air passage. As referred to FIGS. 1A, 1B, the air flowmeter 1 is constructed of a measurement body 3, a sensing unit 4, a circuit module 5, and the like.

As referred to FIG. 2, the measurement body 3 is inserted into an interior of the intake duct 2 through a mount hole 2a formed in the intake duct 2. The mount hole 2a is exposed to air flowing through the intake duct 2.

The measurement body 3 is formed in a flat shape that has the thickness in the thickness-wise direction, as referred to FIG. 1A. The thickness of the measurement body 3 is thinner than the width of the measurement body 3 in the transverse direction (FIG. 1B). The transverse direction is along the direction of air flowing through the intake duct 2 (FIG. 2). In addition, air flowing through the intake duct 2 is referred to as mainstream, and flow of the mainstream is referred to as mainstream flow.

As referred to FIGS. 1A, 1B, a bypass passage 6 is formed within the measurement body 3, through which the mainstream flow partially flows as measurement air. The bypass passage 6 is formed with a U-turn portion (bent portion), which has a U-shape, and a partition 7, along which flow of measurement air is changed by 180 degrees, as shown in FIG. 1B. Specifically, the U-turn portion is in an inverted U-shape in FIG. 1B. An inflow passage 6a is formed in the bypass passage 6 along the radial direction of the intake duct 2 on the upstream side of the U-turn portion. An outflow passage 6b is formed in the bypass passage 6 along the radial direction of the intake duct 2 on the downstream side of the U-turn portion.

Besides, a bypass inlet 8, through which the measurement air flows into the bypass passage 6, is formed in the measurement body 3. Bypass outlets 9, 10, through which the measurement air flows out of the bypass passage 6, are formed in the measurement body 3.

As referred to FIG. 1B, the bypass inlet 8 widely opens to extend from a front surface of the measurement body 3 to a bottom surface of the measurement body 3. The front surface of the measurement body 3 faces the mainstream flow. Accordingly, the measurement air inflowing from the bypass inlet 8 turns in a direction at a substantially right angle with respect to the bypass inlet 8, so that the measurement air flows through the inflow passage 6a, as indicated by an arrow in FIG. 1B.

The bypass outlets 9, 10 include a main outlet ((passage outlet)) 9, which opens to a downstream end of the bypass passage 6, and a sub-outlet 10 arranged between the U-turn portion of the bypass passage 6 and the main outlet 9.

The main outlet 9 is formed in a lower portion of a sidewall surface of the measurement body 3 that defines the outflow passage 6b on the downstream side of the U-turn portion. More specifically, the main outlet 9 is formed in the sidewall surface of the measurement body 3 through the thickness-wise direction. The main outlet 9 is formed on the side of the inside of the outflow passage 6b with respect to the transverse direction, as referred to FIG. 1B. That is, the main outlet 9 is formed in the vicinity of the partition 7. The main outlet 9 opens in a rectangle shape that is extended in the vertical direction of the measurement body 3.

The sub-outlet 10 includes a first sub-outlet 10a and a second sub-outlet 10b. The first sub-outlet 10a is positioned on a path of air that flows on the inside of the bypass passage 6. The second sub-outlet 10b is positioned on a path of air that flows on the outside of the bypass passage 6. The respective sub-outlets 10a, 10b open in the sidewall surface of the measurement body 3 through the thickness-wise direction. However, the first sub-outlet 10a and the second sub-outlet 10b are arranged in different positions with respect to the flow direction of the measurement air that flows in the bypass passage 6. As referred to FIG. 1B, the first sub-outlet 10a is provided on the downstream side of the second sub-outlet 10b.

The sensing unit 4 includes a heater element 4a, which measures an air flow rate, and a temperature sensing element 4b for temperature compensation. The respective elements 4a, 4b are connected to a substrate (not shown), which is accommodated in the circuit module 5, via a terminal 11.

The sensing unit 4 is arranged on the upstream side of the U-turn portion of the bypass passage 6. That is, the sensing unit 4 is arranged inside the inflow passage 6a. Specifically, the sensing unit 4 is arranged in a region, in which the measurement air, which flows from the bypass inlet 8 into the inflow passage 6a, contracts when the flow of the measurement air turns at the substantially right-angle. Alternatively, the sensing unit 4 is arranged in a region immediately after the measurement air turns at the substantially right-angle with respect to the bypass inlet 8.

Besides, the heater element 4a and the temperature sensing element 4b, are electrically connected at both longitudinal ends respectively to the terminal 11. The heater element 4a and the temperature sensing element 4b are oriented lengthwise in a direction substantially in parallel with the mainstream flow (FIG. 2) that flows in the intake duct 2. That is, the heater element 4a and the temperature sensing element 4b are respectively arranged lengthwise in parallel to both thickness-wise side surfaces of the measurement body 3.

The circuit module 5 is provided integrally with a top of the measurement body 3, and is arranged outside the intake duct 2 as shown in FIG. 2. The circuit module 5 controls an electric current, which flows to the heater element 4a, in a manner to maintain a temperature difference between heating temperature of the heater element 4a and detection temperature of the temperature sensing element 4b constant. The detection temperature of the temperature sensing element 4b shows temperature of intake air.

Besides, the circuit module 5 is connected to an ECU (electronic control unit, not shown) via a wire harness (not shown), so that the circuit module 5 transmits a voltage signal to the ECU. The voltage signal is proportional to an electric current, which flows through the heater element 4a. The ECU measures an intake air quantity on the basis of the voltage signal, which is output from the circuit module 5. In addition, a connector 12 (FIGS. 1A, 1B) for connection of the wire harness is integrally molded on the side of the circuit module 5.

In the air flowmeter 1 with the above structure, the first sub-outlet 10a is formed on the path of air that flows on the inside of the bypass passage 6 with respect to the transverse direction of the air flowmeter 1, i.e., with respect to the direction of the mainstream flow. Besides, the second sub-outlet 10b is formed on the path of air that flows on the outside of the bypass passage 6 with respect to the transverse direction thereof. In addition, the first sub-outlet 10a and the second sub-outlet 10b are arranged in different positions with respect to the flow direction of the measurement air. With such structure, a substantial length of the bypass passage 6 can be adjusted in the paths of air flowing on both the inside of the bypass passage 6 and the outside of the bypass passage 6, in accordance with positions of the first sub-outlet 10a and the second sub-outlet 10b. As a result, compensation of intake pulsation is enhanced in accuracy, so that measurement error caused by influences of intake pulsation can be decreased.

Variation of the First Embodiment

Figure 3A:
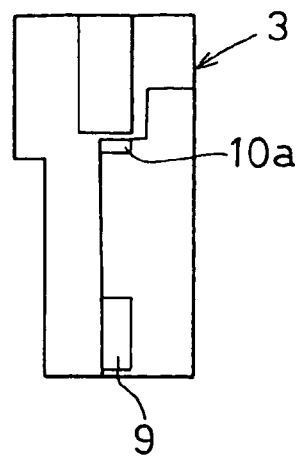
FIGS. 3A, 3B are side views showing a sub-outlet formed in a measurement body of the air flowmeter according to a variation of the first embodiment.
Figure 3B:
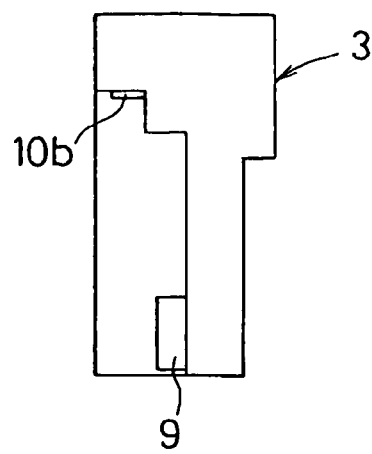

The first sub-outlet 10a and the second sub-outlet 10b described in the first embodiment may be distributed to both sidewall surfaces of the measurement body 3. That is, as shown in FIG. 3A, the first sub-outlet 10a may be formed in one of the sidewall surfaces of the measurement body 3. Besides, as shown in FIG. 3B, the second sub-outlet 10b may be formed in the other of the sidewall surfaces of the measurement body 3.

Figure 4A:
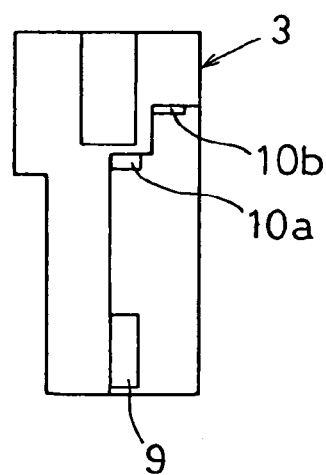
FIGS. 4A, 4B are side views showing a sub-outlet formed in the measurement body of the air flowmeter according to a variation of the first embodiment.
Figure 4B:
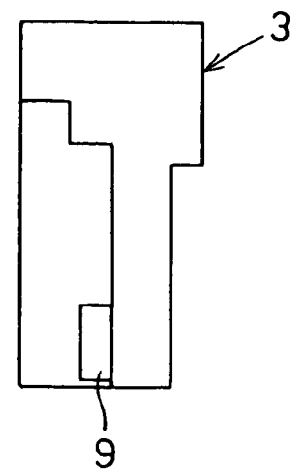

Alternatively, as shown in FIG. 4A, the first sub-outlet 10a and the second sub-outlet 10b may be formed in one (or the other) of the sidewall surfaces of the measurement body 3. Accordingly, as shown in FIG. 4B, only the main outlet 9 is formed on the other of the sidewall surfaces (or on one of the sidewall surfaces) of the measurement body 3.

In the first embodiment, the first sub-outlet 10a is arranged on the downstream side of the second sub-outlet 10b. However, the first sub-outlet 10a may be preferably provided on the upstream side of the second sub-outlet 10b in some cases where the intake system is different in structure, that is, in a case where the mainstream flow is uneven and influences of intake pulsation are different. Accordingly, the physical relationship between the first sub-outlet 10a and the second sub-outlet 10b can be appropriately modified in accordance with the structure of the intake system.

Further, both the first sub-outlet 10a and the second sub-outlet 10b can be arranged on the path of air flowing on the inside of the bypass passage 6, for example. Alternatively, both the first and second sub-outlets 10a, 10b can be arranged on the path of air flowing on the outside of the bypass passage 6. That is, the location, in which the first sub-outlet 10a and the second sub-outlet 10b are arranged, can be appropriately modified throughout a range from the inside of the bypass passage 6 to the outside of the bypass passage 6, in accordance with the structure of the intake system. That is, the location, in which the first sub-outlet 10a and the second sub-outlet 10b are arranged, can be appropriately modified in accordance with magnitude of influences of intake pulsation caused by unevenness of the mainstream flow.

Besides, a third sub-outlet may be formed in addition to the first sub-outlet 10a and the second sub-outlet 10b. The third sub-outlet may be arranged in a position different from those of the first sub-outlet 10a and the second sub-outlet 10b in a range between the inside of the bypass passage 6 and the outside of the bypass passage 6. The third sub-outlet may be arranged in a different position with respect to the flow direction of the measurement air.

In the above structure, the main outlet 9 is formed in the sidewall surface of the measurement body 3 through the thickness-wise direction. However, the main outlet 9 can be formed on the bottom surface of the measurement body 3.

Second Embodiment

Figure 5:
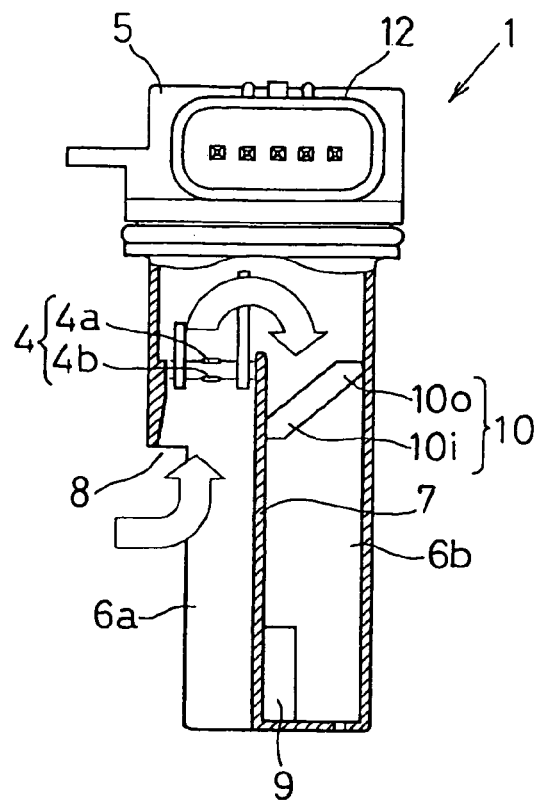
FIG. 5 is a cross sectional view showing the air flowmeter when being viewed from the thickness-wise direction according to a second embodiment of the present invention.

As shown in FIG. 5, a sub-outlet 10 includes an inside opening 10i and an outside opening 10o. The inside opening 10i is positioned on the path of air that flows on the inside of the bypass passage 6 with respect to the transverse direction of the air flowmeter 1. The outside opening 10o opens to the path of air that flows on the outside of the bypass passage 6 with respect to the transverse direction of the air flowmeter 1. Both the openings 10i, 10o are formed as one continuous opening. The inside opening 10i is arranged on the downstream side with respect to the outside opening 10o. Besides, in the second embodiment, a substantial length of the bypass passage 6 can be adjusted between the paths of air flowing on both the inside of the bypass passage 6 and the outside of the bypass passage 6, in the same manner as in the first embodiment. Thereby, compensation of intake pulsation can be enhanced in accuracy, and measurement error caused by influences of intake pulsation can be decreased.

Figure 6:
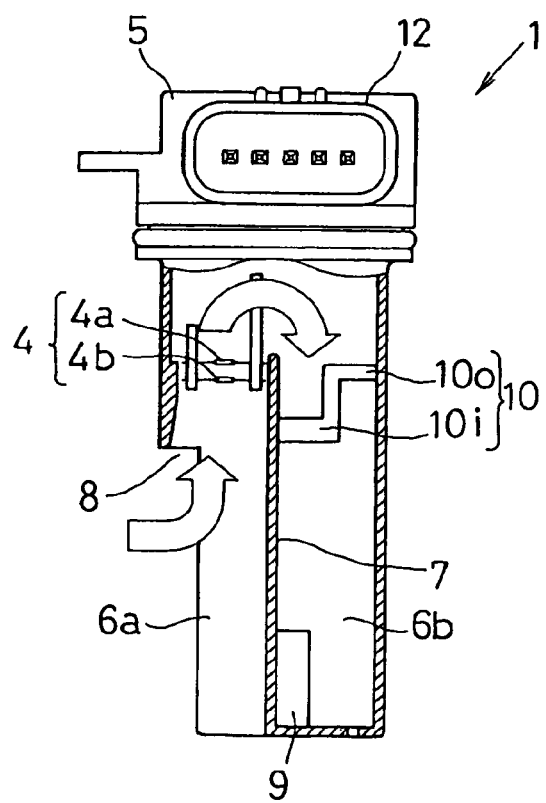
FIG. 6 is a cross sectional view showing an air flowmeter when being viewed from the thickness-wise direction according to the second embodiment.

In the second embodiment, the sub-outlet 10 is formed obliquely relative to the flow direction of the measurement air. Thereby, the inside opening 10i and the outside opening 10o can be formed corresponding to the paths on both the inside of the bypass passage 6 and on the outside of the bypass passage 6. Alternatively, as shown in FIG. 6, the inside opening 10i and the outside opening 10o can be formed as one continuous opening by respectively forming the inside opening 10i and the outside opening 10o to be in substantially same rectangular, for example.

Third Embodiment

Figure 7:
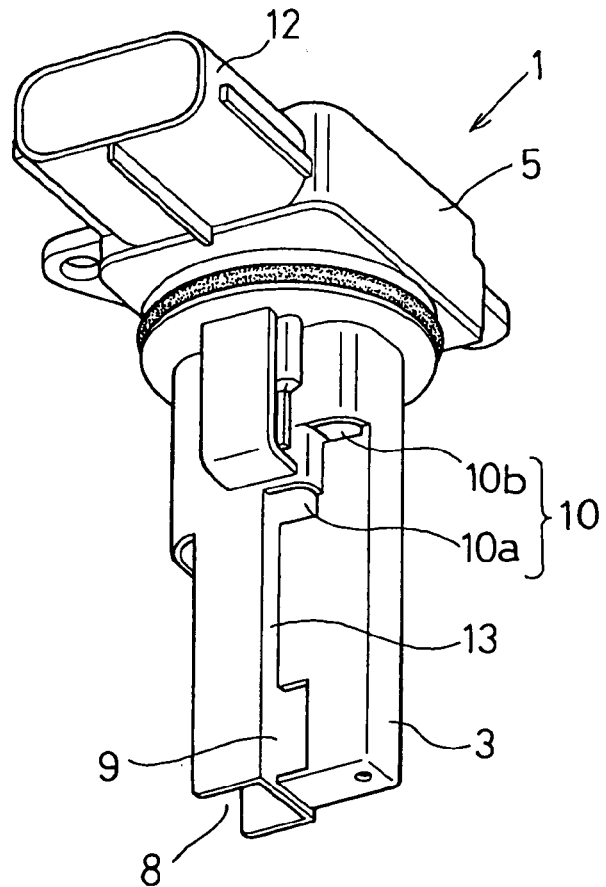
FIG. 7 is a perspective view showing an air flowmeter according to a third embodiment of the present invention.

As shown in FIG. 7, in the third embodiment, a flow deflecting means is provided to the air flowmeter (air flow rate measuring device) 1 described in the first or second embodiment. The flow deflecting means is capable of deflecting the mainstream flow from a sub-outlet 10. As shown in FIG. 7, the sidewall surface, in which the main outlet 9 and the sub-outlet 10 open, of the measurement body 3 is formed to be lower than the sidewall surface of the measurement body 3. The sidewall surface of the measurement body 3 defines the inflow passage 6a on the upstream side of the U-turn portion of the bypass passage 6, and defines an outflow passage 6b. Thereby, a step (flow deflecting means) 13 is formed between both the sidewall surfaces, so that the flow deflecting means can be formed.

Figure 8:
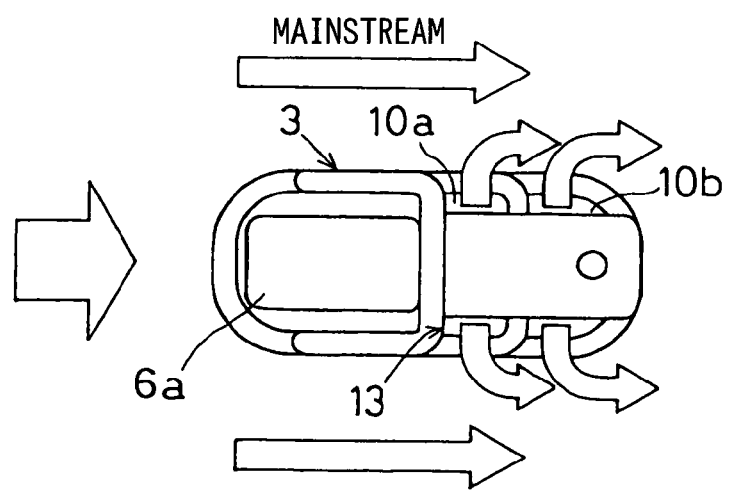
FIG. 8 is a plan view showing a bottom surface of the air flowmeter according to the third embodiment.

As shown in FIG. 8, with this structure, the sub-outlet 10, which includes the first sub-outlet 10a and the second sub-outlet 10b, opens in a position behind the step 13 with respect to the mainstream flow, so that collision between air flowing out of the sub-outlet 10 and the mainstream flow is suppressed. As a result, loss in flow at the sub-outlet 10 can be decreased, so that air flowing out of the sub-outlet 10 is not decreased in flow velocity, and compensation of intake pulsation can be enhanced in efficiency.

Besides, as shown in FIGS. 7 and 8, the sub-outlet 10 can include an opening opened in the flow direction of the measurement air. In this structure, the measurement air can flow out of the opening of the sub-outlet 10 opened along the flow direction thereof. That is, the measurement air is not changed at the sub-outlet 10 in flow direction. Thereby, the measurement air flowing out of the sub-outlet 10 hardly decreases in flow velocity, so that compensation of intake pulsation can be enhanced in efficiency.

In the structure of the air flowmeter (air flow rate measuring device) 1 described in the first embodiment, at least a first sub-outlet 10a and a second sub-outlet 10b are provided corresponding to paths of air flowing through the bypass passage 6. Besides, both the sub-outlets 10a, 10b are different in positions from each other with respect to the flow direction of air. Thereby, a substantial length of the bypass passage 6 can be adjusted in the respective air paths. As a result, even when a bent portion is defined in the bypass passage 6, the first sub-outlet 10a and the second sub-outlet 10b are provided corresponding to paths, along which air flows, whereby, compensation of intake pulsation can be enhanced in accuracy and measurement error caused by influences of intake pulsation can be decreased.

The first sub-outlet 10a is positioned on the path, in which air flows on the inside of the bent portion, and the second sub-outlet 10b is positioned on the path, in which air flows on the outside of the bent portion.

In this structure, compensation of intake pulsation can be enhanced in accuracy by forming the first sub-outlet 10a and the second sub-outlet 10b corresponding to the path, in which air flows on the inside of the bent portion, and the path, in which air flows on the outside of the bent portion.

The first sub-outlet 10a is provided on the downstream side of the second sub-outlet 10b.

The path, in which air flows on the outside of the bent portion, is larger in passage length than the path, in which air flows on the inside of the bent portion. Therefore, compensation of intake pulsation can be enhanced in accuracy by arranging the first sub-outlet 10a on the downstream side of the second sub-outlet 10b corresponding to the passage lengths of the respective air paths.

In the structure of the air flowmeter 1 described in the second embodiment, the inside opening 10i and the outside opening 10o are arranged corresponding to paths of air flowing through the bypass passage 6. Besides, both the openings are shifted in position with respect to the flow direction of air, so that a substantial length of the bypass passage 6 can be adjusted in the respective air paths. As a result, even when the bent portion is provided in the bypass passage 6, the inside opening 10i and the outside opening 10o are provided corresponding to paths, along which air flows, whereby compensation of intake pulsation can be enhanced in accuracy and measurement error caused by influences of intake pulsation can be decreased.

The inside opening 10i of the sub-outlet 10 is arranged on the downstream side of the outside opening 10o of the sub-outlet 10.

The path, in which air flows on the outside of the bent portion, is larger in passage length than the path, in which air flows on the inside of the bent portion. Therefore, the inside opening 10i is arranged on the downstream side of the outside opening 10o corresponding to the passage lengths of the respective air paths, so that compensation of intake pulsation can be enhanced in accuracy.

In the structure of the air flowmeter 1 described in the third embodiment, the step (flow deflecting means) 13 is provided on the wall surface of the measurement body 3, to which the sub-outlet 10 opens. The flow deflecting means 13 is capable of deflecting, i.e., cutting off air, which flows outside the measurement body 3, from the sub-outlet 10.

With this structure, air flowing outside the measurement body 3 is cut off from the sub-outlet 10 by the flow deflecting means 13. Thereby, air, which flows from the sub-outlet 10 into the air passage 2, is restricted from colliding against air, which flows outside the measurement body 3, at the sub-outlet 10, so that loss in flow can be decreased at the sub-outlet 10. As a result, air flowing out of the sub-outlet 10 does not decrease in flow velocity, and compensation of intake pulsation can be enhanced in efficiency.

The step is formed on the wall surface of the measurement body 3, in which the sub-outlet 10 opens. The step is formed on the upstream side of the opening of the sub-outlet 10 with respect to the flow direction of air, which flows outside the measurement body 3. The step serves as the flow deflecting means 13.

In this structure, the sub-outlet 10 is formed on a lower surface of the step, so that the flow deflecting means 13 can be readily provided.

The sub-outlet 10 includes an opening, which opens along the flow direction of air flowing through the bypass passage 6.

With this structure, air flowing through the bypass passage 6 can flow into the air passage 2 from the opening of the sub-outlet 10 opened along the flow direction of the air. That is, the flow direction of the air is not changed at the sub-outlet 10. Thereby, air flowing out of the sub-outlet 10 does not decrease in flow velocity, and compensation of intake pulsation can be enhanced in efficiency.

In the above structure, the sensing unit 4 includes the heater element 4a that measures an air flow rate on the basis of a quantity of heat radiated to air.

A pulsation property of the air flow rate measuring device 1, i.e., performance of measurement for pulsating flow can be improved by adjustment of the bypass passage 6 in length in accordance with the arrangement of the sub-outlet 10. Thereby, it is possible to decrease measurement error caused due to pulsation, which is caused by the use of the heater element 4a for the sensing unit 4.

The structures of the above embodiments can be combined as appropriate.

Various modifications and alternations may be diversely made to the above embodiments without departing from the spirit of the present invention.

What is claimed is:
1. An air flow rate measuring device comprising:
a measurement body that defines a bypass passage and a bent portion, the bypass passage being defined in an air passage through which air flows, the bent portion being arranged midway the bypass passage, the bent portion changing a flow direction of air; and a sensing unit that is arranged in the bypass passage, the sensing unit measuring a flow rate of air flowing through the bypass passage, wherein the measurement body has a wall surface, outside which air flows, wherein the wall surface defines a sub-outlet that is an opening, wherein the sub-outlet is arranged between the bent portion and a passage outlet opened to a downstream end of the bypass passage, the sub-outlet is formed with at least a first sub-outlet and a second sub-outlet, wherein the first sub-outlet and the second sub-outlet open to different paths between a path of air flowing on the inside of the bent portion and a path of air flowing on the outside of the bent portion, and the first sub-outlet and the second sub-outlet are arranged in different positions with respect to a flow direction of air flowing through the bypass passage.

2. The air flow rate measuring device according to claim 1, wherein the first sub-outlet is positioned on the path of air flowing on the inside of the bent portion, and the second sub-outlet is positioned on the path of air flowing on the outside of the bent portion.

3. The air flow rate measuring device according to claim 2, wherein the first sub-outlet is arranged on the downstream side with respect to the second sub-outlet.

4. The air flow rate measuring device according to claim 1, wherein the wall surface of the measurement body, in which the sub-outlet opens, defines a flow deflecting means that is capable of deflecting air, which flows outside the measurement body, from the sub-outlet.

5. The air flow rate measuring device according to claim 4, wherein the measurement body has the wall surface, in which the sub-outlet opens, and the wall surface defines a step as the flow deflecting means on an upstream side of the opening of the sub-outlet with respect to the flow direction of air flowing outside the measurement body.

6. The air flow rate measuring device according to claim 4, wherein the sub-outlet includes an opening that opens along the flow direction of air flowing through the bypass passage.

7. The air flow rate measuring device according to claim 1, wherein the sensing unit includes a heater element that measures an air flow rate on the basis of a quantity of heat, which is radiated to air.

8. An air flow rate measuring device comprising:

a measurement body that defines a bypass passage and a bent portion, the bypass passage being defined in an air passage through which air flows, the bent portion being arranged midway the bypass passage, the bent portion changing a flow direction of air; and a sensing unit that is provided in the bypass passage to measure a flow rate of air flowing through the bypass passage, wherein the measurement body has a wall surface, outside which air flows, wherein the wall surface defines a sub-outlet that is an opening, wherein the sub-outlet is arranged between the bent portion and a passage outlet opened to a downstream end of the bypass passage, the sub-outlet includes an inside opening and an outside opening, wherein the inside opening is positioned on a path of air flowing on an inside of the bent portion, the outside opening is positioned on a path of air flowing on an outside of the bent portion, the inside opening and the outside opening are defined as one continuous opening, and the inside opening and the outside opening are shifted in position with respect to a flow direction of air flowing through the bypass passage.

9. The air flow rate measuring device according to claim 8, wherein the inside opening of the sub-outlet is arranged on the downstream side with respect to the outside opening of the sub-outlet.

10. The air flow rate measuring device according to claim 8, wherein the wall surface of the measurement body, in which the sub-outlet opens, defines a flow deflecting means that is capable of deflecting air, which flows outside the measurement body, from the sub-outlet.

11. The airflow rate measuring device according to claim 10, wherein the measurement body has the wall surface, in which the sub-outlet opens, and the wall surface defines a step as the flow deflecting means on an upstream side of the opening of the sub-outlet with respect to the flow direction of air flowing outside the measurement body.

12. The air flow rate measuring device according to claim 10, wherein the sub-outlet includes an opening that opens along the flow direction of air flowing through the bypass passage.

13. The air flow rate measuring device according to claim 8, wherein the sensing unit includes a heater element that measures an air flow rate on the basis of a quantity of heat, which is radiated to air.

* * * * *